(12) United States Patent
Legner

(10) Patent No.: US 8,752,374 B2
(45) Date of Patent: *Jun. 17, 2014

(54) DEVICE FOR ADJUSTING THE STROKE VOLUME OF HYDRAULIC PISTON MACHINES

(75) Inventor: Jurgen Legner, Friedrichshafen (DE)

(73) Assignee: ZF Friedrichshafen AG, Friedrichschafen (DE)

( * ) Notice: Subject to any disclaimer, the term of this patent is extended or adjusted under 35 U.S.C. 154(b) by 1111 days.

This patent is subject to a terminal disclaimer.

(21) Appl. No.: 12/679,520

(22) PCT Filed: Aug. 15, 2008

(86) PCT No.: PCT/EP2008/060761
§ 371 (c)(1),
(2), (4) Date: Mar. 23, 2010

(87) PCT Pub. No.: WO2009/047039
PCT Pub. Date: Apr. 16, 2009

(65) Prior Publication Data
US 2010/0192576 A1    Aug. 5, 2010

(30) Foreign Application Priority Data

| Oct. 2, 2007 | (DE) | 10 2007 047 193 |
| Oct. 2, 2007 | (DE) | 10 2007 047 194 |
| Oct. 2, 2007 | (DE) | 10 2007 047 195 |
| Oct. 4, 2007 | (DE) | 10 2007 047 513 |

(51) Int. Cl.
*F16D 39/00*    (2006.01)

(52) U.S. Cl.
USPC ........................................... 60/492

(58) Field of Classification Search
USPC .............................. 60/491, 492, 452; 475/72
See application file for complete search history.

(56) References Cited

U.S. PATENT DOCUMENTS

| 2,583,656 | A |   | 1/1952  | Lay |          |
| 2,808,737 | A |   | 10/1957 | Bullard, III | |
| 2,946,193 | A | * | 7/1960  | Chittenden | 60/389 |
| 3,023,638 | A |   | 3/1962  | Westbury et al. | |
| 3,204,486 | A |   | 9/1965  | Lalio | |
| 3,212,358 | A |   | 10/1965 | Lalio | |
| 3,508,401 | A | * | 4/1970  | Aplin | 60/389 |
| 3,579,979 | A | * | 5/1971  | Bosch et al. | 60/431 |
| 3,580,107 | A | * | 5/1971  | Orshansky, Jr. | 475/78 |
| 3,601,981 | A |   | 8/1971  | Ifield | |
| 3,626,787 | A |   | 12/1971 | Singer | |

(Continued)

FOREIGN PATENT DOCUMENTS

| AT | 197 650 B | 10/1957 |
| DE | 1 069 978 | 11/1959 |

(Continued)

*Primary Examiner* — Edward Look
*Assistant Examiner* — Michael Quandt
(74) *Attorney, Agent, or Firm* — Davis & Bujold, PLLC; Michael J. Bujold

(57) ABSTRACT

A device for adjusting the stroke volume of a first piston engine (1), having a bent-axis design, and a second piston engine (2), having a bent-axis design, and a common component (4) by which the stroke volumes can be adjusted. A valve (12) is provided which, when a maximum pressure level in the working lines (3) is exceeded, the valve (12) is reversed such that the common component (4) reverses the stroke volumes toward a lower power consumption arrangement.

9 Claims, 2 Drawing Sheets

(56) References Cited

U.S. PATENT DOCUMENTS

| | | |
|---|---|---|
| 3,714,845 A | 2/1973 | Mooney, Jr. |
| 3,834,164 A | 9/1974 | Ritter |
| 4,019,404 A | 4/1977 | Schauer |
| 4,026,108 A * | 5/1977 | Pensa ............................ 60/444 |
| 4,121,479 A | 10/1978 | Schauer |
| 4,434,681 A | 3/1984 | Friedrich et al. |
| 4,446,756 A | 5/1984 | Hagin et al. |
| 4,548,098 A * | 10/1985 | Besson et al. .................... 475/32 |
| 4,563,914 A | 1/1986 | Miller |
| 4,776,233 A | 10/1988 | Kita et al. |
| 4,813,306 A | 3/1989 | Kita et al. |
| 4,976,664 A | 12/1990 | Hagin et al. |
| 5,071,391 A | 12/1991 | Kita |
| 5,421,790 A | 6/1995 | Lasoen |
| 5,473,895 A * | 12/1995 | Bausenhart et al. ............ 60/448 |
| 5,493,862 A * | 2/1996 | Folsom ............................ 60/404 |
| 5,643,122 A | 7/1997 | Fredriksen |
| 5,667,452 A | 9/1997 | Coutant |
| 5,766,107 A | 6/1998 | Englisch |
| 5,868,640 A | 2/1999 | Coutant |
| 5,890,981 A | 4/1999 | Coutant et al. |
| 6,029,542 A | 2/2000 | Wontner |
| 6,056,661 A | 5/2000 | Schmidt |
| 6,062,022 A * | 5/2000 | Folsom et al. .................. 60/438 |
| 6,358,174 B1 * | 3/2002 | Folsom et al. .................. 475/72 |
| 6,485,387 B1 | 11/2002 | Goodnight et al. |
| 6,530,855 B1 * | 3/2003 | Folsom et al. .................. 475/72 |
| 6,592,485 B2 | 7/2003 | Otten et al. |
| 6,761,658 B1 | 7/2004 | Stettler, Jr. |
| 6,997,838 B2 * | 2/2006 | Folsom et al. .................. 475/72 |
| 7,097,583 B2 | 8/2006 | Lauinger et al. |
| 7,354,368 B2 | 4/2008 | Pollman |
| 7,448,976 B2 | 11/2008 | Hiraki et al. |
| 7,788,917 B2 * | 9/2010 | DeMarco et al. ............... 60/452 |
| 2002/0042319 A1 | 4/2002 | Otten et al. |
| 2003/0089107 A1 | 5/2003 | Tani |
| 2003/0150662 A1 | 8/2003 | Tani |
| 2003/0166430 A1 | 9/2003 | Folsom et al. |
| 2004/0242357 A1 | 12/2004 | Ishizaki |
| 2006/0094554 A1 | 5/2006 | Schmidt |
| 2006/0276291 A1 | 12/2006 | Fabry et al. |
| 2007/0277520 A1 | 12/2007 | Gollner |
| 2007/0281815 A1 | 12/2007 | Gollner |
| 2008/0085801 A1 | 4/2008 | Sedoni et al. |
| 2008/0103006 A1 | 5/2008 | Pollman et al. |
| 2008/0214349 A1 | 9/2008 | Liebherr et al. |
| 2008/0214351 A1 | 9/2008 | Katayama et al. |
| 2009/0270212 A1 | 10/2009 | Ueda et al. |
| 2010/0056318 A1 | 3/2010 | Glockler |

FOREIGN PATENT DOCUMENTS

| | | |
|---|---|---|
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

DEVICE FOR ADJUSTING THE STROKE VOLUME OF HYDRAULIC PISTON MACHINES

This application is a National Stage completion of PCT/EP2008/060761 filed Aug. 15, 2008, which claims priority from German patent application serial no. 10 2007 047 194.9 filed Oct. 2, 2007; German patent application serial no. 10 2007 047 193.0 filed Oct. 2, 2007; German patent application serial no. 10 2007 047 195.7 filed Oct. 2, 2007 and German patent application serial no. 10 2007 047 513.8 filed Oct. 4, 2007.

FIELD OF THE INVENTION

The invention relates to a device for adjusting the stroke volume of hydraulic piston engines.

BACKGROUND OF THE INVENTION

Hydraulic piston engines are used, for example, in hydrostatic-mechanical torque-splitting transmissions for the hydraulic power branch in order to continuously vary the gear ratio of the transmission. For this purpose, the hydraulic piston engines need adjustment devices by means of which the stroke volume of the piston engines can be adjusted.

DE 42 06 023 A1 discloses a continuously variable hydrostatic-mechanical torque-splitting transmission having hydraulic piston engines and adjustment devices by means of which the piston engines can be adjusted continuously. The adjustment device comprises control elements by means of which the piston engines can be controlled. In order to protect the system from overload, the adjustment device has a high-pressure relief valve by which the maximum pressure can be limited. When the high-pressure relief valve is activated, energy is converted into heat which has to be dissipated via a cooler.

SUMMARY OF THE INVENTION

The object underlying the present invention is to provide an adjustment device, for the stroke volume of hydraulic piston engines, which has a simple design and protects the system from overheating.

The object is achieved by an adjustment device of this type, which also has the characterizing features of the main claim.

The adjustment device has a first and a second piston engine, wherein the piston engines have a bent-axis design. Piston engines of the bent-axis design are distinguished by very good efficiencies. The two piston engines are arranged adjacent to one another and have a common component, a so-called yoke, by means of which the stroke volumes of the two piston engines can be adjusted together. The piston engines have working lines by way of which the two piston engines are connected to one another. The piston engines thereby form a so-called closed loop. The common component, for adjusting the stroke volume of the piston engines, is arranged such that in a first position of the common component the first hydraulic piston engine is adjusted to a small or a no stroke volume and the second hydraulic piston engine is adjusted to a large or a maximum stroke volume. The first hydraulic piston engine operates as a pump, for example, and delivers pressurized medium to the second piston engine, which operates as a motor in this operating state. In the other operating state, the second piston engine operates as a pump and the first piston engine operates as a motor. If the common component is adjusted from the first position thereof toward a second position, the stroke volume of the first piston engine, for example of the pump, is increased and, at the same time, the stroke volume of the second piston engine, for example of the motor, is reduced. During operation in the second position of the common component, the first piston engine, when operating as a pump, has the maximum stroke volume thereof and thus delivers a maximum volume flow and the second piston engine, during operation as a motor, has the minimum stroke volume thereof and thus produces a high output rotational speed. The common component can be adjusted by means for adjustment, for example a hydraulic cylinder, from a first position toward a second position or from a second position toward a first position.

A driver of a vehicle, using a system for manual input, for example using an accelerator pedal that mechanically or electrically controls a valve, in this way can transmit the driver's wishes to the means for adjusting the common component, whereby the common component is adjusted as a function of the driver's wishes, and thus the actuation of the system for manual input. If the driver would like a higher output rotational speed in the second piston engine, then the common component is adjusted toward the second position. If the driver would like a lower output rotational speed, then the common component is adjusted toward the first position. If road resistance rises, there is the possibility that an allowable pressure in the working lines, between the first and second piston engines, will be exceeded.

According to the invention, when a previously defined pressure level is exceeded, the common component is adjusted toward a first position whereby the first piston engine, for example the pump, is adjusted toward a smaller stroke volume and the second piston engine, for example the motor, is adjusted toward a larger stroke volume so that the pressure in the working lines drops. This previously defined pressure level is below a maximum allowable pressure level at which high-pressure relief valves open, which prevents overheating of the system since the energy is not converted into heat by the high-pressure relief valves.

In another embodiment of the invention, by way of another system for manual input, there is the possibility to specify an even lower maximum pressure level whereby the common component is adjusted toward the first position, at an even lower pressure level. This makes it possible to control the maximum allowable pressure continuously. When using a double-acting hydraulic cylinder that is adjusted by high pressure on the rod end of the cylinder into the starting position thereof, and, in this starting position, is connected to the common component in the first position thereof, there is the possibility, by pressurizing this hydraulic cylinder at the bottom end with pressure from a pressure medium source, to move the common component from the first position toward the second position. When connecting the bottom end of the hydraulic cylinder to a pressure medium reservoir, the common component is moved back toward the first position. The system for manual input can have another valve that connects the pressure medium cylinder to the pressure medium source or to the pressurize medium reservoir, depending on the driver's wishes, and thus determines the position of the common component, whereby the output rotational speed of the piston engine is established.

It is thus possible, by way of the system for manual input, to control the common component in the sense of rotational speed control, and by way of the other system for manual input to bring about a limitation of the pressure level by adjusting the common component toward the first position.

The common component here is connected to a sensor such that an electronic control unit can determine the position of the common component, and at least one sensor determines the pressure in the working line and in the hydraulic unit, and, from this pressure and the position of the common component, the electronic control unit controls the direction of adjustment of the common component as a function of the manual input.

By subjecting the cylinder to high pressure, it is possible to produce high adjusting forces on the common component, without using a cylinder that has very large surfaces.

BRIEF DESCRIPTION OF THE DRAWINGS

Other characteristics can be found in the description of the figures.

The figures show.

DETAILED DESCRIPTION OF THE PREFERRED EMBODIMENTS

Figure 1:
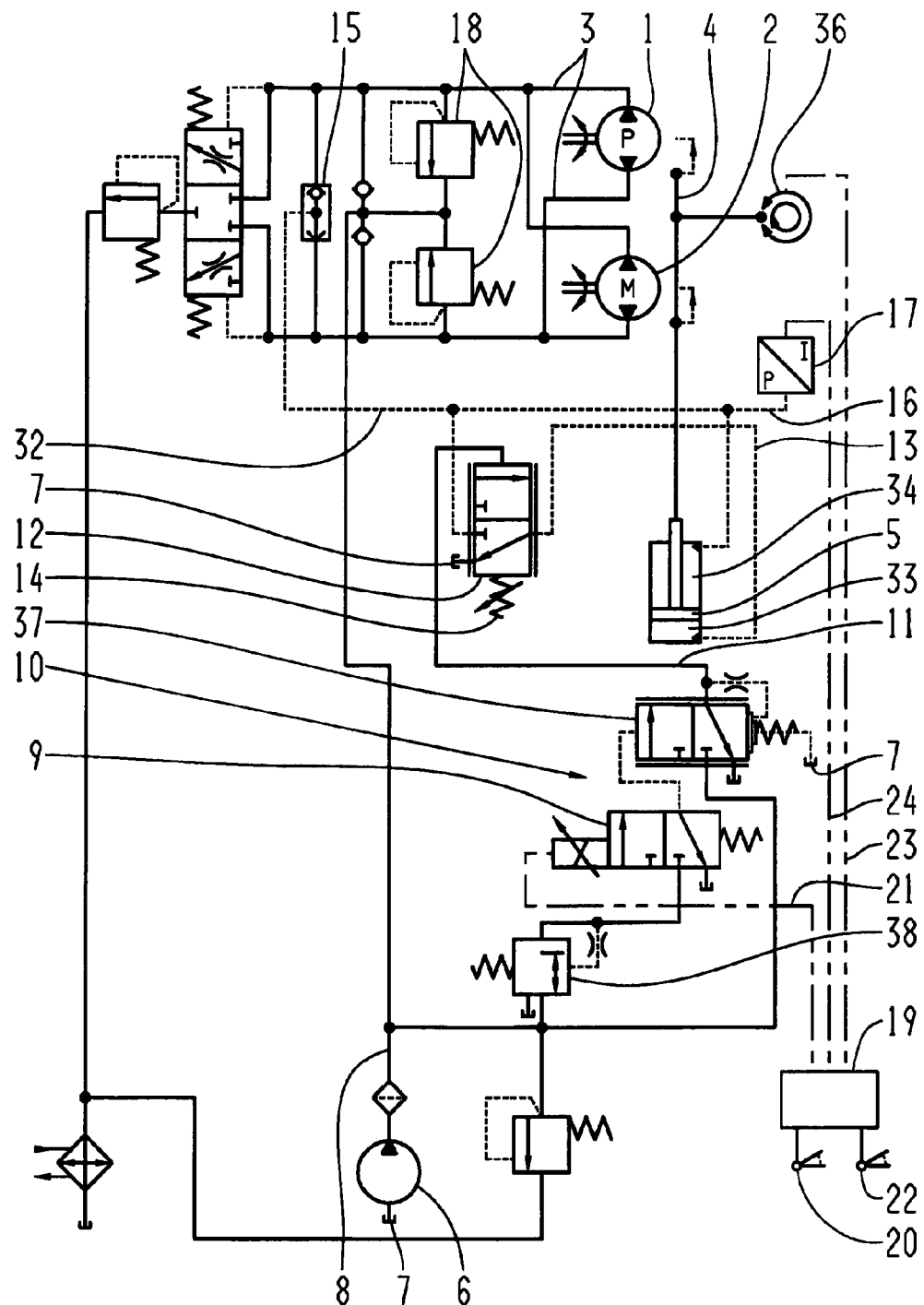
FIG. 1 is a hydraulic diagram of the adjustment device.
Figure 2:
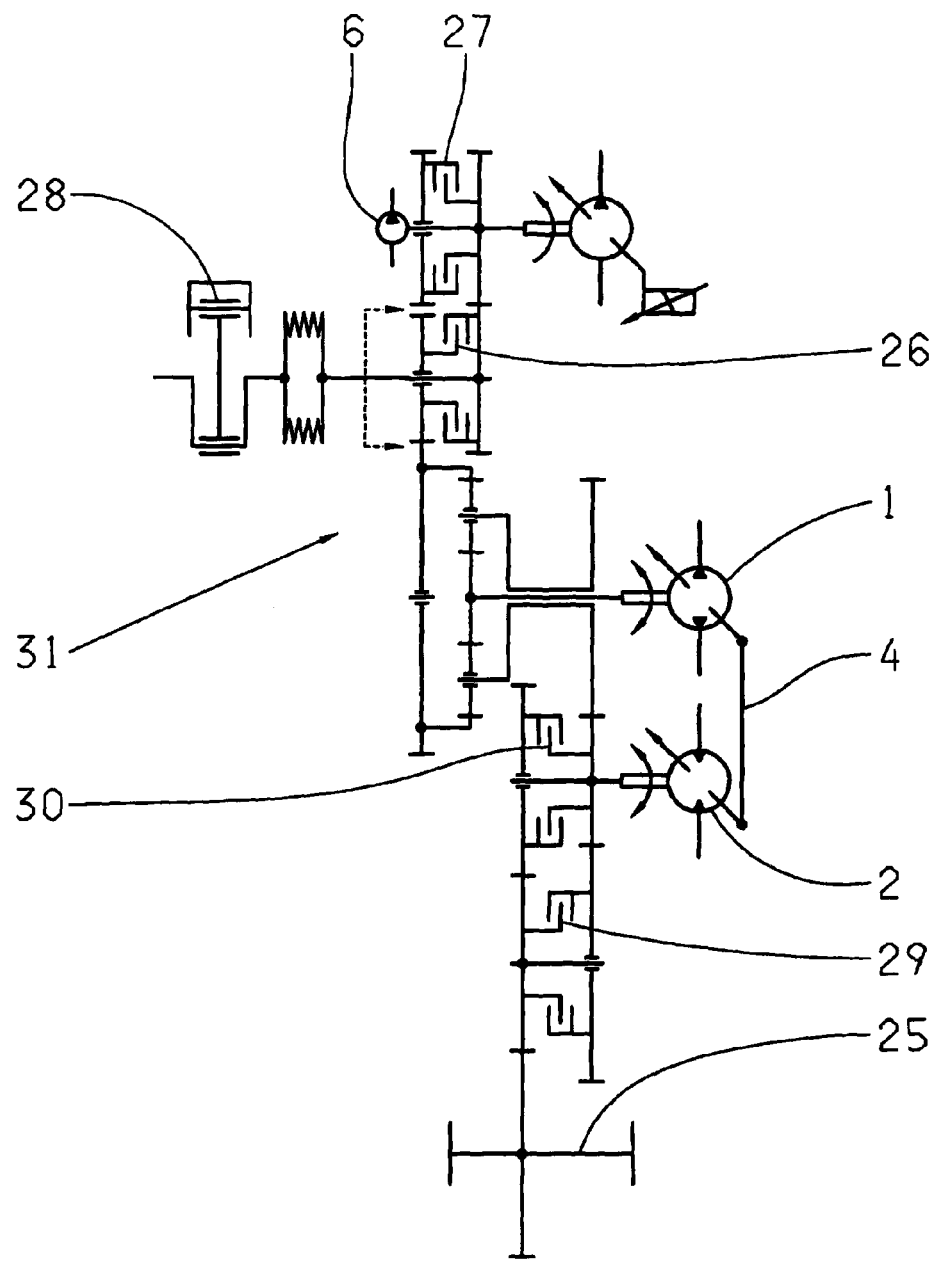
FIG. 2 is a transmission diagram of a hydrostatic-mechanical torque-splitting transmission.

FIG. 1:

The adjustment device has a first piston engine 1 of a bent-axis design which operates in an operating state, for example as a pump, and a second piston engine 2, of a bent-axis design, which operates in an operating state, for example as a motor. The first piston engine 1 and the second piston engine 2 are connected to one another by working lines 3. The stroke volumes of the first piston engine 1 and of the second piston engine 2 are adjusted by way of a common component 4. A double-acting hydraulic cylinder 5 is connected to the common component 4. The cylinder 5 is connected, at a rod end 34 thereof, to the line 16 as a result of which the cylinder 5, when the force of the pressure on the rod end 34 exceeds the force from the pressure on the bottom end 33, can be adjusted into the starting position thereof using a high pressure. The first piston engine is adjusted to a zero stroke volume, in other words, when the first piston engine 1 is driven, it does not supply pressure medium, in the state of the hydraulic cylinder 5 in which pressure is applied only on the rod end. In the state of the hydraulic cylinder 5 in which pressure is applied only to the rod end, the second piston engine 2 is adjusted to a maximum stroke volume. A pressure medium source 6 delivers the pressure medium from a pressure medium reservoir 7 into the line 8. If the common component 4 is to be adjusted from the first position thereof toward the second position with hydraulic cylinder 5 being unpressurized on the bottom end, then the valve 9 of the system for a manual input 10 is reversed so that the pressure medium flows from the line 8 into the line 11. If the valve 12 is not in the base position thereof, then the pressure medium flows from the line 32 through the line 13 into the bottom end of the hydraulic cylinder 5 and adjusts the common component 4 toward the second position whereby the stroke volume of the first piston engine is increased, the stroke volume of the second piston engine is reduced, and pressure medium is delivered, via the working lines 3, from the first piston engine 1 to the second piston engine 2. In the unpressurized state of the line 11, the valve 12 is retained in the base position thereof by the adjustable spring 14. Via the shuttle valve 15 by way of the line 16, the higher pressure in the working lines 3 reaches the pressure sensor 17. The pressure sensor 17, in conjunction with the electronic control unit 19, controls the valve 9 such that, below the opening level of the pressure relief valves 18, the valve 12 is reversed to the base position thereof so that the pressure medium of the line 13 no longer reaches the hydraulic cylinder 5 and the bottom end 33 of the hydraulic cylinder 5 is connected to the pressure medium reservoir 7, whereby the common component 4 is adjusted toward the first position, so that the pressure in the working lines 3 again drops. In that, below the pressure level of the pressure relief valves 18, the valve 12 is reversed, the pressure relief valves 18 remain closed so that the drive remains protected from overheating. If the pressure in the working lines 3 again drops, the valve 12 is moved out of the starting position thereof and the pressure medium, from line 13, again reaches the hydraulic cylinder 5. A sensor 36 is connected to the common component 4 such that a position thereof can be sensed and is transmitted, via the control line 23, to the electronic control unit 19. The sensor 36 can be designed as a contactless rotational angle sensor or as a path sensor. The electronic control unit 19, on the one hand, is informed of the desired speed from the accelerator pedal 20 and, on the other hand, is informed of a desired torque from another system for manual input 22. Depending on instructions from the other system for manual input 22, a desired pressure level is set in the working lines 3 whereby, in conjunction with the knowledge of the stroke volume from the sensor 36 and of the pressure level from the sensor 16, the electronic control unit 19 can set a desired drive power. For example, a maximum tractive force can be limited, exceeding which causes the common component 4 to be reduced. In conjunction with the input rotational speed from the accelerator pedal 20, the electronic control unit 19 can carry out continuous power setting. For this purpose, the electronic control unit 19 controls the valve 9, via the control line 21, which then controls the hydraulic cylinder 5 and thereby the common component 4, via the valve 37 and the valve 12. When the valve 9 is designed to directly process the pressure of the pressure medium source 7, the valves 37 and 38 can also be omitted. When using the adjustment device in a mobile vehicle, continuous setting of tractive power can be provided through this continuous limitation of the high pressure. In conjunction with the electronic control unit 19 and the sensor 36, continuous speed setting can be provided by the system for manual input 10. When the continuous speed setting is combined with the continuous tractive force setting by the sensor 17, continuous power regulation of the vehicle can be achieved.

FIG. 2:

The hydrostatic-mechanical torque-splitting transmission has a first piston engine 1 and a second piston engine 2 of the type described in FIG. 1, the stroke volumes of which can be adjusted by the common component 4. By way of a clutch for forward travel 26 or a clutch for reverse travel 17, the output 25 can be connected to the input 28. The operating ranges can be engaged by a clutch 29 and a clutch 30. The summing gear 31 sums the mechanical and hydraulic power branches.

REFERENCE NUMERALS

1 First piston engine
2 Second piston engine
3 Working line
4 Common component
5 Hydraulic cylinder
6 Pressure medium source
7 Pressure medium reservoir
8 Line
9 Valve
10 System for manual input
11 Line
12 Valve
13 Line 14 Spring
15 Shuttle valve
16 Line
17 Pressure sensor
18 Pressure relief valve
19 Electronic control unit
20 Accelerator pedal
21 Control line
22 Other system for manual input
23 Control line
24 Control line
25 Output
26 Clutch for forward travel
27 Clutch for reverse travel
28 Input
29 Clutch
30 Clutch
31 Summing gear
32 Line
33 Bottom end
34 Rod end
35 Valve
36 Sensor
37 Valve
38 Valve

The invention claimed is:

1. An adjustment device for adjusting a stroke volume of hydraulic piston engines having a bent-axis design, comprising:
- a first piston engine (1) being arranged adjacent to a second piston engine (2),
- the first and the second piston engines each having a working line (3) by which the first and the second piston engines are hydraulically connected to one another,
- the piston engines having adjustable axes connected by a common component (4) such that movement of the common component (4) simultaneously adjusts the adjustable axes,
- whereby in a first position of the common component (4), the first hydraulic piston engine (1) is adjusted to one of a small and a no stroke volume and the second hydraulic piston engine (2) is adjusted to one of a large and a maximum stroke volume, and in a second position of the common component (4), the first hydraulic engine (1) is adjusted to one of a large and a maximum stroke volume and the second hydraulic piston engine (2) is adjusted to one of a small and a minimal stroke volume,
- a device (5) for adjusting the common component (4) is a hydraulic cylinder;
- the common component (4) is adjustable toward one of a first position and a second position as a function of a rotational speed specification (20);
- the common component (4) is adjustable toward the first position independently of the rotational speed specification (20) when a previously defined pressure in one of the working lines (3) is exceeded;
- an electronic control unit (19) controls the device for adjusting the common component (4) as a function of the position of the common component, as a function of a pressure in the working line and as a function of the speed specification; and
- a manual pressure limit adjuster (22) is present by which the common component (4), upon actuating the manual pressure limit adjuster (22), is adjusted toward the first position as a function of the pressure in the working lines (3) and as a function of the actuation of the manual pressure limit adjuster (22).

2. The adjustment device according to claim 1, wherein the device for adjusting the common component (5) is a double-acting hydraulic cylinder which, in a position thereof, retains the common component (4) in the first position with pressure on a rod, and, when a bottom face (33) is subjected to pressure, adjusts the common component (4) toward the second position.

3. The adjustment device to claim 1, wherein the common component is connected to a sensor for position detection (36).

4. The adjustment device according to claim 3, wherein the pressure in the working pressure (3) is determined by a pressure sensor (17).

5. The adjustment device according to claim 1, wherein, above a previously defined pressure in the working lines (3), the electronic base control unit (19) regulates the common component toward the position.

6. The adjustment device according to claim 1, wherein the first piston engine (1) and the second piston engine (2) are controlled in a sense of continuous power regulation.

7. The adjustment device according to claim 1, wherein the first piston engine (1) and the second piston engine (2) are arranged in a hydrostatic-mechanical torque-splitting transmission having a hydraulic branch and a mechanical branch, and the hydraulic branch is connected to the first piston engine (1) and the second piston engine (2).

8. The adjustment device according to claim 1, wherein the first piston engine is rotationally fixedly connected to a sun gear of a planetary gear set summing gear (31) of a hydrostatic-mechanical toque splitting transmission and the second piston engine is fixedly connected to a clutch (30), though which torque can be transmitted to the second piston engine (2) to an output shaft (25) of the transmission.

9. The adjustment device according to claim 8, wherein
- the hydrostatic-mechanical torque-splitting transmission has a hydraulic branch and a mechanical branch,
- the hydraulic branch is connected to the first piston engine (1), and
- the second piston engine (2) summing gear (31) sums the mechanical and the hydraulic power branches.

* * * * *